United States Patent [19]

Kohler

[11] Patent Number: 4,486,626

[45] Date of Patent: Dec. 4, 1984

[54] METHOD OF AND SYSTEM FOR LIMITING ACCESS TO A GROUP OF TELEPHONE TRUNKS

[75] Inventor: Joylee E. Kohler, Northglenn, Colo.

[73] Assignee: AT&T Technologies, Inc., New York, N.Y.

[21] Appl. No.: 393,278

[22] Filed: Jun. 29, 1982

[51] Int. Cl.³ .......................... H04M 3/38; H04M 3/42
[52] U.S. Cl. ............................... 179/18 DA; 179/18 B; 179/18 EA
[58] Field of Search .......... 179/18 DA, 18 D, 18 BG, 179/18 EA, 18 B, 18 FH

[56] References Cited

U.S. PATENT DOCUMENTS

| | | | |
|---|---|---|---|
| 3,934,095 | 1/1975 | Matthews et al. | 179/18 D |
| 4,122,308 | 10/1978 | Weinberger et al. | 179/7.1 R |
| 4,139,739 | 2/1979 | von Meister et al. | 179/18 B |
| 4,163,124 | 7/1979 | Jolissaint | 179/18 D |
| 4,348,554 | 9/1982 | Asmuth | 179/18 B |
| 4,410,765 | 10/1983 | Hestad et al. | 179/7.1 R |

OTHER PUBLICATIONS

"Expanding the Role of Private Switching Systems", S. E. Bush et al., *Bell Laboratories Record*, Oct. 1979, pp. 243-248.

*Primary Examiner*—Thomas W. Brown
*Attorney, Agent, or Firm*—R. F. Kip, Jr.

[57] ABSTRACT

After a telephone switching system user has dialed sufficient digits to identify a call as extending beyond the system, the system attempts to route the call over trunks which will result in the least expense to the user. If all of these trunks are busy, the system then searches to find an idle trunk in identified groups of trunks. If an idle identified trunk is found, a warning tone is returned to the user and before the system will seize the identified trunk and complete the call, the user must signal with a predetermined code within a certain time period. In a nonpredetermined code is signaled, the call is terminated by the system.

5 Claims, 4 Drawing Figures

METHOD OF AND SYSTEM FOR LIMITING ACCESS TO A GROUP OF TELEPHONE TRUNKS

TECHNICAL FIELD

This invention relates to methods and a system for limiting access to a group of telephone trunks and more, particularly, to methods and a system for limiting access to certain groups of trunks until a predetermined code is dialed by a calling subscriber.

BACKGROUND OF THE INVENTION

Most state-of-the-art program controlled Private Branch Exchanges (PBX) have particular programs stored in the PBX memory for routing calls dialed by a PBX user which calls extend beyond the PBX. For example, the Dimension ® PBX, designed by Bell Telephone Laboratories, Inc., and manufactured by the Western Electric Co., Inc. of New York, N.Y., has an Automatic Route Selection (ARS) and an Automatic Routing (AAR) programs stored within the PBX memory which programs examine the digits dialed by a PBX user to determine if the dialed digits describe a call placed beyond the PBX. If the programs determine that the dialed call extends beyond the PBX, the dialed digits are further examined to determine the most desirable (least expensive) communication route which can be established to complete the call. For instance, the programs will initially attempt to complete the call on leased facilities, such as outgoing trunks which are dedicated to the PBX customer's use (e.g., WATS, customer switching network). The PBX customer is charged a flat monthly rate for use of leased facilities as compared with charges paid per call for use of trunks associated with the Direct-Distance-Dialing (DDD) network. Additionally, since DDD charges vary with use during peak load periods at specific time intervals during the work day, use of leased facilities during these time periods result in uniform, and less expensive, billing.

Only after it is determined that the least expensive facilities are busy, will the PBX programs instruct the PBX system to attempt to place the call on an idle Direct-Distance-Dialing (DDD) network trunk. However, prior to establishing the call on the idle DDD trunk, the PBX system is instructed to transmit a one second distinctive tone to the calling user as a warning that the PBX system has selected an idle DDD trunk. If the user hangs up, the call is terminated before the DDD facilities are used and the user can attempt to place the call at a later time when the least expensive facilities are available. By not hanging up and terminating the call, the user indicates that the call is to proceed and the PBX system completes the call on the DDD trunk.

Even with the introduction of the distinctive warning tone to indicate selection of a DDD trunk, PBX customers are noticing that many PBX users ignore the warning tone or are unaware of the purpose of the warning tone to utilize DDD trunks when, in reality, the calls can be placed at a different time when less expensive trunks are available. Additionally, because the warning tone is so often ignored, the least expensive facilities are under-utilized at certain periods of the day.

There is a need, therefore, for methods and a system to limit access to the expensive trunks and to encourage users to utilize the least expensive trunking facilities.

SUMMARY OF THE INVENTION

The above problem is solved by this invention which requires a station user to dial a code after the telephone switching system has determined that a call placed by the user can be only completed over one of an identified group of trunks. If an incorrect code or no code is dialed, the station user is not given access to any one of the identified group of trunks and the call is terminated.

In an embodiment of the present invention, a hierarchal trunk access arrangement is based on a dial access code wherein a user can access an idle Direct-Distance-Dialing (DDD) trunk only after the system determines that the trunks associated with the customers leased facilities are busy and after the user has dialed a predetermined access code.

BRIEF DESCRIPTION OF THE DRAWINGS

Other features and advantages of the invention, its organization, construction and operation will best be understood from the following detailed description of a specific embodiment thereof, taken in conjunction with the accompanying drawings in which.

DETAILED DESCRIPTION

Figure 1:
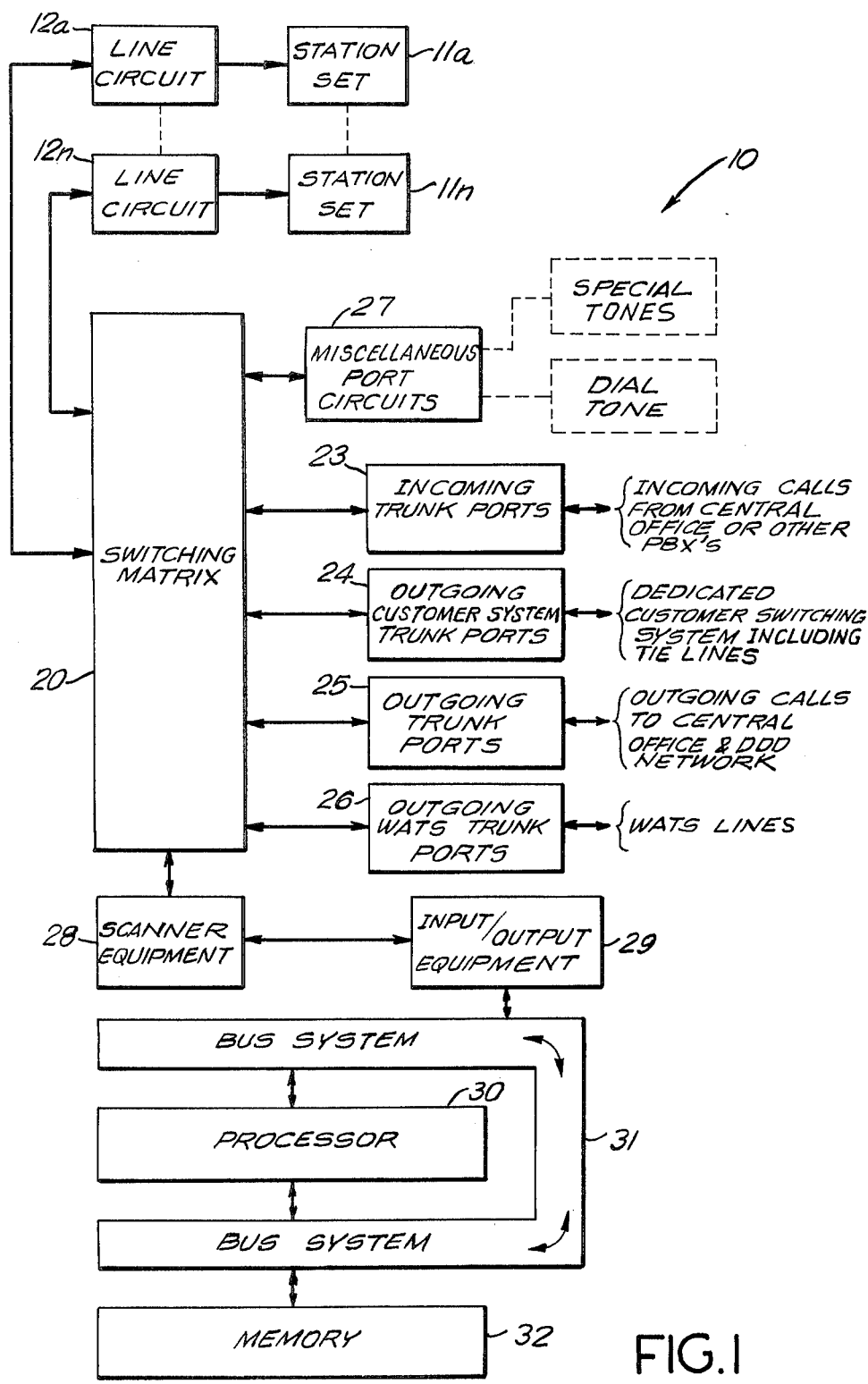
FIG. 1 is a block schematic of a Private Branch Exchnage (PBX) in accordance with certain principles of the invention.

Referring now to FIG. 1, there is seen a block schematic diagram of a PBX system 10 comprising a plurality of PBX station telephone sets 11a ... 11n connected on a one per line circuit 12a ... 12n basis to a switching matrix 20 which interconnects a plurality of peripheral units, such as port circuits with other equipment in the system, with each other, and with the plurality of PBX station sets 11a ... 11n. For instance, matrix 20 interconnects a number of trunk ports 23 through 26 through which incoming and outgoing calls are handled for system 10 and also interconnects miscellaneous ports 27 for providing various tones and signals, such as a dial tone, intercept tone, and other circuit functions to any one of station sets 11a ... 11n. System 10 also includes scanner equipment 28, input/output equipment 29, and a central processor 30.

The functions of the port circuits 23, 24, 25 and 26 are to provide a means to connect circuits to matrix 20 (talking path), to provide on-hook/off-hook status to the scanner 28 and to receive commands from processor 30 to have the circuit associated with the port circuit change state (e.g., become idle, busy, etc.).

Incoming trunk ports 23 interconnect incoming trunks which terminate at a local telephone central office, or at other PBX's, with matrix 20 through which PBX System 10 accepts incoming calls dialed from outside the system to one of the PBX station sets 11a ... 11n or to another trunk. Calls dialed within PBX System 10 station sets 11a ... 11n to numbers outside system 10 must be established through one of the outgoing trunk port groups 24, 25 or 26 for connection with a corresponding outgoing trunk. Outgoing customer system trunk port group 24 interconnects switching matrix 20 with outgoing trunks which are associated with a switching system dedicated to the PBX customer's use. For example, many large corporations have dedicated switching systems which interconnect the many corporate locations together in a single telecommunications system. Outgoing port group 24 allows users of PBX system 10 access to the corporate switching system. Outgoing DDD trunk port group 25 interconnects switching matrix 20 with the local telephone company central office and then to the DDD network while outgoing WATS trunk port group 26 interconnects matrix 20 with a group of WATS (Wide Area Telephone Service) lines. WATS lines are rented from the telephone company at relatively less expensive flat rates as compared with usage charges for DDD service. On calls placed to telephone numbers outside of switch system 10, it is preferred to utilize the trunks associated with outgoing port group 24 which connects with the corporate switching system since this use does not result in charges for each call appearing on these trunks. The next choice is to use the WATS trunk port group 26 to connect with a WATS line since these lines are leased facilities and the customer is charged a flat rate for the facility regardless of how often it is used. The last resort is to use a DDD trunk associated with outgoing ports 25 since its use is directly billed by the telephone company based on the time of day and length of time used on each call.

Scanner equipment 28 has two essential functions. One is to address a specific port circuit as a result of commands received from processor 30 (e.g., connections to matrix 20). The other function is to return scan data to processor 30 via bus system 31 regarding the busy-idle status of the scanned port circuits.

Input/output equipment 29 facilitates the transmission and reception of data to and from scanner equipment 28 via bus 31.

Processor 30 controls all the activities in system 10 by executing instructions which are part of a control program stored in memory 32.

Processor 30 reads a control instruction from memory 32 at a rate of approximately one instruction every 10 to 25 milliseconds, and, in response to the read control instruction executes a series of commands. Processor 30, communicating within system 10 by using bus system 31, can, for example, transmit a series of commands over bus system 31 to scanner equipment 28 to scan for changes in the busy/idle status of the various ports interconnected with matrix 20.

Processor 30 controls call processing by periodically interrogating the status of various circuits within system 10, such as port circuits 21, 23, matrix 20 and scanner equipment 28, interpreting changes of status in these circuits, and issuing commands to particular circuits in accordance with instructions read from memory 32 to advance a call status in a logical manner.

Changes in central processor 30 control are also generated by program timers which are interpreted as changes which require advancing the call status. The progress of each call handled by system 10 is recorded in memory 32 in a call progress table and a change of state in any unit involved with the call is detected by scanner equipment 28 and transmitted to processor 30 via bus system 31. Processor 30 next consults the control program stored in memory 32 to determine the next logical step to be undertaken to process the call and commands are then transmitted by processor 30 to have the necessary tasks accomplished by the required circuits to perform the next step in the call handling program sequence.

The tasks performed by system 10 described in the embodiment disclosed herein as being executed by program controlled processor 30 can be implemented in many other ways. For instance, program controlled processor 30 can be replaced by independent hardware circuits designed to provide specific functions presently provided by program controlled processor 30.

Memory 32, which stores the control program and contains memory areas called progress tables for storing data collected by processor 30 regarding the progress of each call being handled by system 10 as described above, also contains other memory areas called status tables which show the current status of each piece of equipment in system 10. Additionally, memory 32 has memory locations called translation tables which translate a predetermined number of dialed digits into the termination location of equipment within PBX system 10 or into a request for additional digits. For example, if the first three digits dialed are 201, processor 30 would have the digits translated by translation tables in memory 32 to discover the routing requirement to complete the call, which outgoing trunks can complete the call, and the equipment termination of the corresponding trunk ports on matrix 20. Memory 32 also has memory locations, called queues, into which processor 30 stores identification information regarding calls awaiting connection to an idle termination, such as a trunk or operator. Thus, not only does processor 30 read instructions from the control program stored in memory 32, processor 30 also writes data into particular locations of memory 32 regarding call handling and the status of equipment within system 10.

Memory 32 also has stored in a particular memory area programs for routing calls placed by a user from any one of the station sets 11a . . . 11n to a telephone number identifying a station located outside of PBX system 10. One such program, called Automatic Route Selection (ARS), is activated when a PBX user at a station set 11a . . . 11n dials a particular code which is detected by scanner equipment 28 and recognized by processor 30. The ARS program is then accessed by processor 30, which program comprises instructions to attempt to complete the outside call dialed by the station user on a least expensive idle trunk, e.g., dedicated switching system line or WATS line before attempting to complete the call on an idle DDD trunks.

Figure 2A:
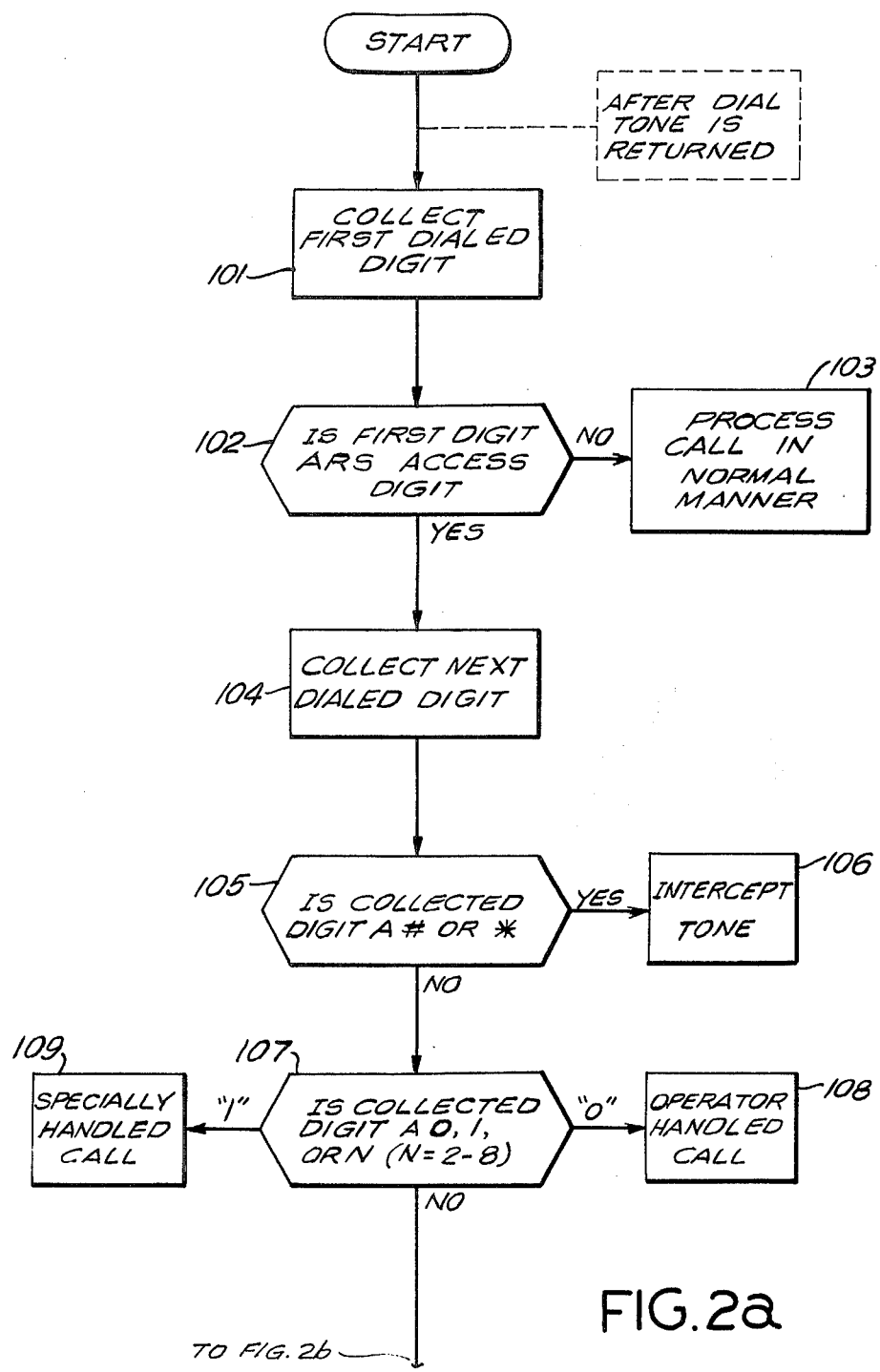
FIGS. 2a, 2b and 3 show various flow diagrams which illustrate the programmed procedure of control and operation of the system of FIG. 1 in accordance with certain principles of the invention.
Figure 2B:
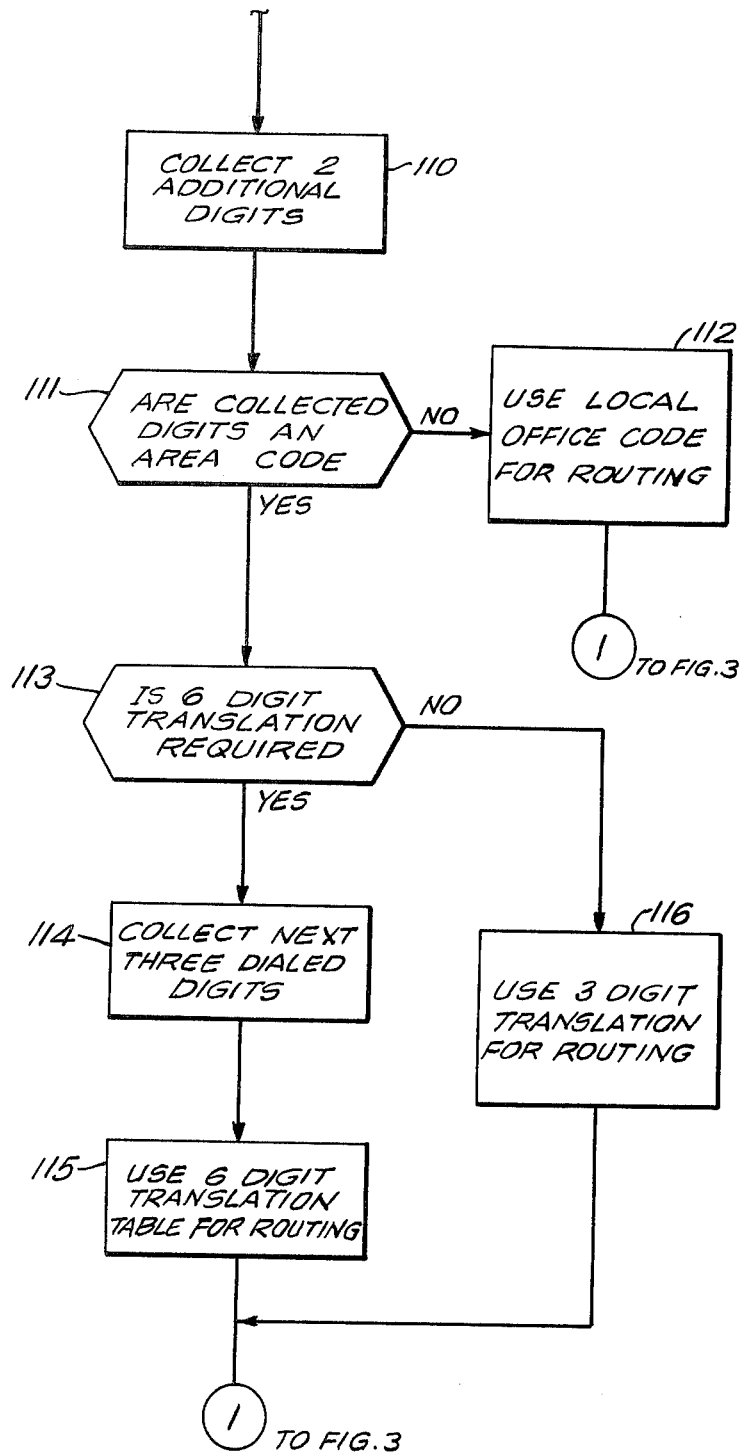
Figure 3:
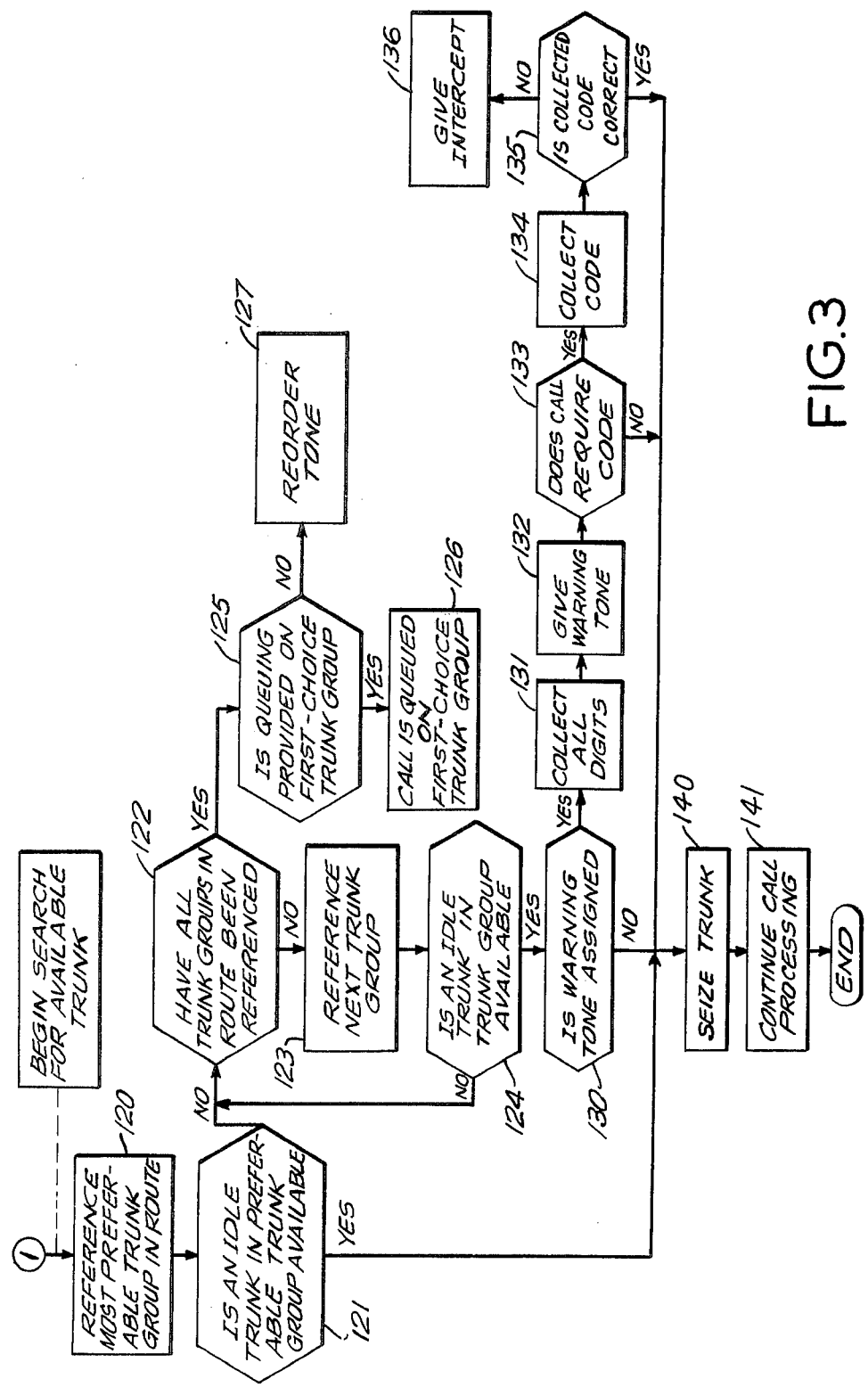

Referring to FIGS. 2a, 2b and 3, which are flow charts or state tables of the program controlled system 10, the figures reveal the steps of a program which enables system 10 to limit access to certain outgoing trunk port groups to particular users at any station set 11a . . . 11n connected to matrix 20. The program represented as steps in FIGS. 2a, 2b and 3 is of a type which any competent programmer could write to implement the system illustrated therein.

After a user has picked up the telephone handset at any station, for instance at station 11n (FIG. 1), dial tone is returned to the station in a normal manner and the user begins dialing digits necessary for identifying the called station and which digits system 10 uses to establish the required interconnections with the called station. If the user at station 11n dials digits which identify a called party outside PBX system 10 and which request completion of the call via the least expensive trunk available, the Automatic Route Selection (ARS) program stored in memory 32 will respond by attempting to place the call on the least expensive (WATS, customer system) trunks before attempting to establish a connection on the DDD trunks. If all of the least expensive trunks are busy prior to establishing connections on an idle DDD trunk, system 10 will attempt to limit access to the DDD trunk to the user at station 11n in the manner described in detail below.

When the user at station 11n lifts the telephone handset, scanner equipment 28 informs processor 30 via bus system 31 that station 11n has gone off-hook and is requesting dial tone. Processor 30 then issues instructions, as read from memory 32, via bus system 31 and input/output equipment 29 to matrix 20 and miscellaneous port circuits 27 to connect dial tone with station 11n.

The user at station 11n, upon hearing dial tone, begins dialing the digits which request that the call be processed on the least expensive trunk available and which identify the called party and, therefore, the type of call being placed. The first dialed digit is detected by scanner equipment 28 and transferred to processor 30 (FIG. 1) via input/output equipment 29 and bus 31. As the first digit is dialed and collected by processor 30 in step 101 of FIG. 2a, processor 30 compares the first digit dialed with the access digit for the "Automatic Route Selection" programs stored in memory 32 as seen in step 102. If the first dialed digit is not the access code, which code is for instance the digit "9," the call is handled in a normal manner. If the first dialed digit is a "9," the "ARS" programs stored in memory 32 are then activated by processor 30 for instructions on how to process the call.

The "ARS" programs now instruct processor 30 via bus 31, FIG. 1, to collect the next digit dialed by station user 11n, as detected by scanner equipment 28, and then determine if the collected digit is a # or a * in steps 104 and 105 (FIG. 2a). If the digit is a # or a *, processor 30 issues instructions to have an intercept tone returned immediately to station 11n in step 106 since the next digit dialed does not correspond to an acceptable next digit stored in the calling routine located in memory 32. Intercept tone is returned by processor 30 issuing instructions via bus 31 to scanner equipment 28 (FIG. 1) to have matrix 20 set up connections between station set 11n and miscellaneous port circuits 27 for intercept tone. After station set 11n is detected by scanner equipment 28 as going back "on-hook," processor 30 issues instructions to terminate the call in memory 32 (FIG. 1) and to have matrix 20 break the connection between station set 11n and miscellaneous port circuit 27 in a normal manner.

If the collected digit is not a * or a #, processor 30 next determines if the collected digit is a 0, 1 or N in step 107 where N equals digits 2 through 8. The collected dialed digit identifies the type of call which is being placed by the user, i.e., if the digit is a "0," the call is being directed to an operator for handling as seen in step 108; if the digit is a "1," the call is being placed to another station serviced by PBX system 10 for special handling as seen in step 109; if the first digit is N, the call is identified as being directed to a party outside of system 10. If the first digit dialed is an N, that is, one of the digits 2-8, processor 30 is instructed in step 110 (FIG. 2b) to collect the next 2 digits dialed at station 11n. Scanner equipment 28 (FIG. 1) detects the next 2 digits dialed which are collected and transmitted via bus system 31 to processor 30 (FIG. 1). In step 111 (FIG. 2b), processor 30 uses the three-digit translation tables located in memory 32 to determine if the three dialed digits are an area code, that is the first three digits identifying a long distance call. If the three dialed digits are not an area code, that is, the first three digits define a local telephone company office, the local office code routing table located in memory 32 is referenced in step 112. If the three first three digits dialed are an area code, translation tables stored in memory 32 are accessed by processor 30 via bus 31 (FIG. 1) for determining whether a six-digit translation is required in step 112. If the call is directed to a telephone number which system 10 requires the first six digits to route the call to an appropriate trunk (e.g., requires area code + office number), three additional digits are collected and the six-digit translation tables stored in memory 32 are used by processor 30 for routing the call to the appropriate trunk group in steps 113 and 114 of FIG. 2b. If only three digits are required, these three digits are translated to determine which trunk group shall be used for further processing the call in step 115 of FIG. 2b.

Routing information concerning the outgoing trunks terminated at outgoing trunk ports 24, 25 and 26 is stored in memory 32 in tables called trunk patterns. Each trunk pattern contains information concerning all the trunks terminated by system 10 which can provide a route to a particular termination located outside system 10. For instance, if PBX user 11n dials 212—which is an area code—as the three digits to be translated, processor 30 has 212 translated in memory 32 and memory 32 provides, via bus 31 (FIG. 1), the trunk pattern information to processor 30 which information identifies all the trunks terminated at matrix 20 which can be used to extend the call to the 201 area. Typically, the trunk pattern will contain a number of different groups of trunks, a customer switching system trunk group terminated at trunk port 24, DDD trunks group terminated at ports 25 and a WATS lines group terminated at ports 26.

Thus, after translating the first three or six digits to determine the proper routing information, processor 30 is provided with the proper trunk pattern and now begins referencing the group of trunks in the pattern to select an idle trunk according to instructions listed in the ARS programs stored in memory 32. In step 120 of FIG. 3, the first group of trunks in the selected pattern is referenced and a determination is made if an idle trunk in the trunk group is available in step 121. The ARS program stored in memory 32 references the most preferable, least expensive, trunk group first; that is the dedicated customer switching system trunks first and the busy/idle status of each trunk in the group is sequenced through to find an idle trunk. If no idle trunk is available in that trunk group, the other trunk groups, i.e., WATS lines trunk groups, are referenced to determine if any idle trunk is available in these groups in steps 123 and 124. If all trunk groups have been checked and no idle trunk is available, the routine moves into step 125 of FIG. 3 where it is determined whether or not queueing is provided on a first choice trunk group pattern. If queueing is available, the call at this point is placed in a queue located in memory 32 until one of the trunks in the first choice trunk group (the least expensive group) becomes idle and at which time the call is directed to the idle trunk and the routine begins again with step 121. If queueing is not available, reorder tone is sent back to station set 11n in step 127 and the call is terminated.

If all the trunk groups in the pattern have not been referenced, the next trunk group is referenced and if an idle trunk exists in the group, processor 30 is made aware of the availability of the trunk in step 124. Processor 30 is next instructed in step 130 via signals sent over bus 31 (FIG. 1) to search appropriate tables in memory 32 to determine if a warning tone is assigned to that particular trunk and if a warning tone is not assigned to the trunk, processor 30 is instructed to seize the trunk in step 140 and to continue to process the call in step 141. However, if the available trunk selected in step 121 or 124 is an expensive trunk, for instance—a DDD trunk, a warning tone is assigned at the trunk's location in memory 32 to warn the user that DDD trunk is being used to process the call. Processor 30 is instructed in step 131 to wait until all the digits have been dialed by the station user at station 11n (FIG. 1) and to store all the digits in memory 32 prior to returning warning tone to the station user. This is done so that a warning tone is not returned to the station 11n user while still dialing the remaining digits.

After all the digits have been collected by processor 30 and stored in memory 32, processor 30 issues instructions to matrix 20 via bus system 31, input/output equipment 29 and scanner equipment 28 to interconnect an idle miscellaneous port circuit 27 with station set 11n so that a warning tone can be returned from special tones circuit, miscellaneous port circuit 27, switching matrix 20, line circuit 12n to station set 11n as seen in FIG. 1. Once the connection is established, miscellaneous trunk port 27 is signalled to have special tones circuit transmit a warning tone to station set 11n. After the reception of the warning tone at station 11n, processor 30 transmits instructions to matrix 20 to break the connection between station set 11n and miscellaneous port circuit 24 and is then indexed by the program stored in memory 32 to step 133 (FIG. 3) to determine whether station user 11n is required to dial a code or identification code. The identification code can comprise any number of predetermined digits which are stored in memory 32 and which a user must dial before the call is allowed to process. Typically, the identification code is a single digit and processor 30 determines if the code is required by searching the memory location in memory 32 (FIG. 1) associated with station 11n to determine if station 11n requires an identification code. If station user 11n is required to dial an identification code, processor 30 collects the code in step 134 and determines whether the code is correct by comparing the dialed code with the code stored in memory 32 in step 135. If the dialed code is not correct, or if the station user at station 11n does not dial a code within a prescribed period of time (typically 10 seconds after the warning tone is transmitted), intercept tone is returned to station user 11n in step 136, or the call is terminated by processor 30. Intercept tone is returned to station set 11n in the same manner as previously described for returning intercept tone to station set 11n, namely processor 30 issues instructions to matrix 20 via bus 31, input/output equipment 29 and scanner equipment 28 to establish a connection between an idle miscellaneous port circuit 27 and station set 11n (FIG. 1) to have intercept tone returned to station set 11n. After station set 11n is detected by scanner equipment 28 as going back on-hook, the call is terminated by processor 30 and the connection with miscellaneous port circuit 27 is broken.

If the identification code dialed by station user 11n is correct, the trunk is seized in step 140. The trunk is seized by processor 30 signalling memory 32 via bus 31 (FIG. 1) to change the busy/idle status of the trunk in memory to busy and to show the trunk as being associated with this call. Processor 30 next begins to send instructions to matrix 20 to establish connections to outpulse the digits previously stored in memory 32 as required to complete the call and to process the call in a normal manner as shown in step 141.

It will also be apparent that one skilled in the art may make various modifications and changes to the apparatus disclosed herein without departing from the spirit and scope of this invention.

What is claimed is:

1. In a telephone switching system having a plurality of trunk groups arranged in a particular hierarchy, wherein one or more of the trunk groups are identified, a method of seizing an idle trunk in an identified trunk group in the hierarchy when a user of the switching system initiates a call requiring the idle trunk comprising the steps of:

(a) accessing the first group of trunks according to the arranged hierarchy;

(b) sequencing through each trunk in the accessed group to determine if any trunk in the group is idle;

(c) accessing the next group of trunks according to the arranged hierarchy if no idle trunk is found in the previously sequenced group of trunks until an idle trunk is sequenced and found;

(d) selecting the idle trunk when an idle trunk is found;

(e) returning a warning tone to the user when the selected trunk is in one of the identified trunk groups;

(f) seizing the selected trunk only if the user has dialed a predetermined code after the warning code has been returned to the user; and (g) terminating the call if the user does not dial the predetermined code.

2. A method as recited in claim 6 wherein if the user does not dial the predetermined code during a particular time slot, the call is terminated.

3. A method as recited in claim 6 wherein, prior to step (e), the method comprises the further step of:

checking the status of the calling user to determine if a warning tone is to be returned to the user if the selected trunk is in one of the identified trunk groups.

4. A program controlled telephone switching system arranged for providing only limited access to a predetermined group of trunks included within a larger number of trunks in the system comprising:

(a) a switching matrix;

(b) a plurality of station sets interconnected with said switching matrix;

(c) a plurality of trunks interconnected with said switching matrix consisting of said group of trunks and other trunks;

(d) common control equipment responsive to dialing signals received from any station set of said plurality of sets as an initial part of an intended telephone call from said set to a called party identified by said signals for controlling said switching matrix to preselect for establishment a connection between said station set and an identified trunk included in said plurality of trunks and providing a route for telephone calls from said matrix to said called party;

(e) means responsive to a determination that such identified trunk is included within said group of trunks and to dialing of all said signals needed to identify said called party for returning a warning tone to said station set; and (f) means responsive only to a predetermined code dialed from said set within a predetermined time period after said tone has been returned to allow said common control equipment to establish the connection between such identified trunk and said station set, said last-named means being operable in the absence of a dialing within said period of said predetermined code to prevent completion of said intended telephone call from said set.

5. A program controlled telephone switching system as recited in claim 4 in which said last-named means is operable in conjunction with prevention of completion of said intended telephone call to effect transmission to said station set of an intercept tone generated by a tone generator.

* * * * *